United States Patent [19]

Heckett

[11] 3,747,888

[45] July 24, 1973

[54] RESILIENTLY MOUNTED VEHICLE SEAT

[76] Inventor: Frank A. Heckett, 9809 34th Ave. S.W., Seattle, Wash. 98126

[22] Filed: Feb. 15, 1972

[21] Appl. No.: 226,583

[52] U.S. Cl.............. 248/373, 248/399, 267/117, 267/132, 267/155, 297/195
[51] Int. Cl.......... F16f 5/00, F16f 13/00, B62j 1/04
[58] Field of Search................ 248/204, 373, 399, 248/400; 267/65 R, 117, 131, 132, 133, 154, 155; 297/195

[56] References Cited
UNITED STATES PATENTS

| | | | |
|---|---|---|---|
| 1,446,772 | 2/1923 | Seilbel | 267/132 |
| 2,575,496 | 11/1951 | Krotz | 267/132 |
| 2,587,121 | 2/1952 | Deardorff et al. | 267/132 X |
| 3,025,032 | 3/1962 | Leja | 267/133 X |
| 3,198,474 | 8/1965 | Doll | 267/65 R X |
| 3,265,345 | 8/1966 | Vuichard | 267/117 |
| 3,298,654 | 1/1967 | Dome | 248/400 |
| 3,300,203 | 1/1967 | Carter et al. | 267/117 |
| 3,436,048 | 4/1969 | Greer | 248/400 X |

Primary Examiner—Gerald M. Forlenza
Assistant Examiner—Howard Beltran
Attorney—Richard W. Seed, Harvey M. Cross, Jr. et al.

[57] ABSTRACT

A ride control for the seat of a vehicle such as a motorcycle is disclosed which provides cushioned body support and soft ride for the vehicle operator without excessive rebound. A cylindrical housing is mounted horizontally in a fixed position relative to the seat assembly. Members, one adjustably fixed and the other rotatable, are mounted in each end of the cylindrical housing. An axially wound torsion spring extends through the cylindrical housing between the members and is secured thereto. A mechanical linkage is connected between the rotatable member and frame of the vehicle for movement in response to dynamic and/or shock loadings imposed on the vehicle and seat. A plurality of blades extend axially from the rotatable member. The cylindrical housing is partially filled with a viscous fluid through which the blades must pass. A drag is imposed on the movement of the rotatable member by passage of the blades through the viscous fluid during loading and unloading of the torsion spring, thereby dampening and cushioning shock and dynamic loadings imposed on the seat.

4 Claims, 4 Drawing Figures

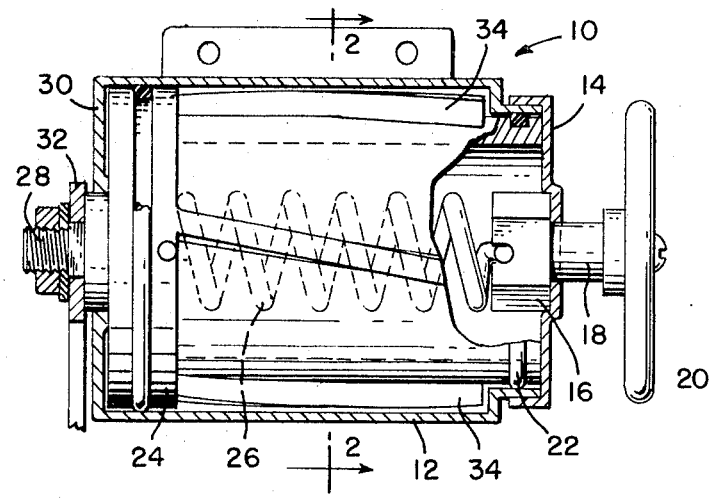
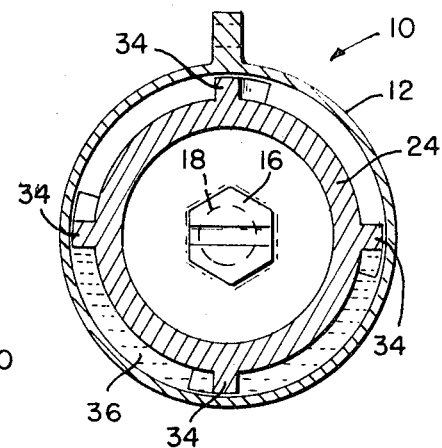
FIG. 1  FIG. 2
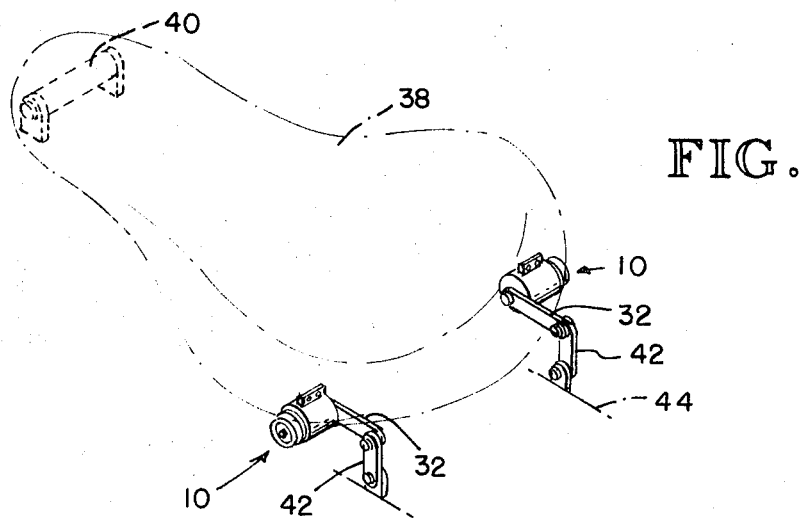
FIG. 3
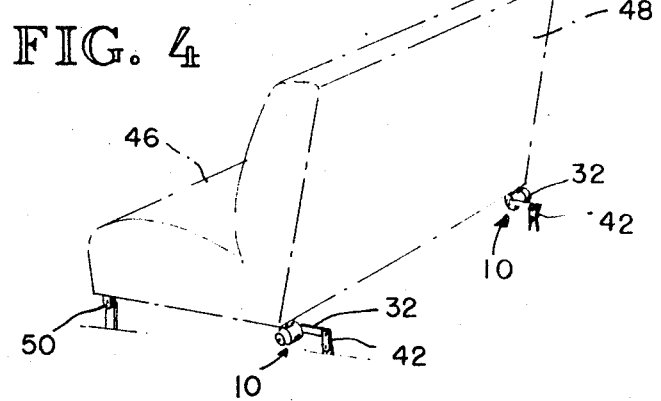
FIG. 4

3,747,888

RESILIENTLY MOUNTED VEHICLE SEAT

BACKGROUND OF THE INVENTION

1. Field of the Invention

This invention relates to an adjustable ride control assembly for the seat of a motordriven vehicle, particularly motorcycles.

2. Prior Art Relating to the Disclosure

Certain vehicles such as heavy duty trucks, agricultural machinery and earth moving equipment have relatively rough rides in terms of the vehicle operator. Numerous systems have been devised for cushioning and softening the ride for operators of such vehicles. Examples of such cushioning systems are found in U. S. Pat. Nos. 3,198,474; 3,265,345; 3,298,654; 3,300,203 and 3,436,048.

Of recent there has been increased use of motor bicycles on unimproved trails in mountainous and desert areas. Certain of the motorcycles commercially available today have a seat-suspension system comprising a single long compression spring that extends downwardly from about the center of the seat into the bike frame. Different spring weights are required for different weights of vehicle operators. This suspension system is not very effective when riding over rough terrain because of excessive rebound, resulting in discomfort. Smaller motorcycles have no seat suspension system.

SUMMARY OF THE INVENTION

This invention relates to a vehicle seat assembly employing an adjustable ride control. The ride control has a cylindrical housing mounted horizontally to the seat support or frame of the vehicle. Members, one adjustable and the other rotatable, are mounted in each end of the cylindrical housing. An axially wound torsion spring extends between the members. A plurality of spaced apart blades extends axially of the housing and the rotatable members. A mechanical linkage is operatively connected between the rotatable member having the integral blades and the frame of the vehicle to suspend the seat of the vehicle for rising and falling movement in response to dynamic and/or shock loadings imposed on the seat. A viscous fluid fills the lower portion of the cylindrical housing through which the blades pass on relative rotation of the member, the blades imposing a viscous drag on rotation of the member relative to the adjustable member during unloading and loading of the torsion spring.

The objects of this invention are to provide a ride control assembly which (1) is compact, (2) is relatively inexpensive to manufacture, (3) can be mounted in a small space, (4) is completely self-contained, (5) has adjustable shock absorbing ability and (6) utilizes no external hydraulic or air system to aid in operation of the unit.

BRIEF DESCRIPTION OF THE DRAWINGS

FIG. 1 is a vertical cross-sectional view of the ride control assembly of this invention;

FIG. 2 is a view along section line 2—2 of FIG. 1 illustrating the arrangement of the blades in the cylindrical housing;

FIG. 3 is a partial view of a motorcycle seat illustrating one way in which the ride control assembly can be mounted; and FIG. 4 is a perspective view of a truck or other vehicle seat illustrating mounting of the ride control assembly.

DESCRIPTION OF THE PREFERRED EMBODIMENTS

FIG. 1 shows a vertical cross-sectional view of the ride control assembly 10. A cylindrical housing 12 is sealed at one end by end member 14. Within the housing and abutting the end member 14 is a tension block 16 which is adjustably rotatable. A shaft 18 secured to the tension block 16 extends through the end member 14 and has mounted on its free end a spring tension control wheel 20.

A rotatable member 24 is mounted in the cylindrical housing 12. The rotatable member is a hollow cylindrical member extending substantially the length of the housing 12. The rotatable member 24 includes an integral shaft portion 28 extending through the end member 30 to which linking arm 32 is secured.

A number of spaced appart blades 34 extend axially along the rotatable member 24. The blades may be straight or curved in an axial direction as illustrated. If curved, the angle may be from 0.25 to 0.50 inch curvature for every inch of length. As shown in FIG. 2, the blades 34 turn in a viscous fluid 36 which fills the lower one-third to one-half of the interior of the cylindrical housing 12. O-rings 22 or other suitable sealing means are mounted around the respective ends of member 24 to prevent fluid leakage from within the cylinder.

An axially wound torsion spring 26 is attached at one end to member 24, extends through rotatable member 24 and is secured at the other end to tension block 16. The size and tension of the spring is dependent on how and where the assembly is to be used; that is, for a motorcycle or vehicle seat. The torsion spring is generally made from heavy-duty piano wire or other suitable material. The tension on the torsion spring is adjusted by pressing in on tension control wheel 20 and rotating the tension block 16 a predetermined amount. The tension block 16, as shown in FIG. 2, is hexagonal and mates with shoulders on the inner surface of the end member 14 to adjust the torsion spring to different settings.

The ride control assembly is mounted for operation as illustrated by FIG. 3 and FIG. 4. The cylindrical housing 12 is always horizontally mounted as shown. In FIG. 3 a motorcycle seat 38 pivotally mounted at its forward end 40 has one or a pair of the ride control assemblies 10 mounted toward the rear of the seat. The linking arms 32 are pivotally secured at their free ends to an extension link 42 which is pivotally secured to the frame 44 of the motorcycle. When two ride control assemblies are used care should be taken to insure that the torsion springs are each loaded on turning of the linking arm 32 in response to dynamic and/or shock loadings and not unwound as this will cause failure.

As shown in FIG. 4 a vehicle seat having a seat portion 46 and a backrest portion 48 is pivotally mounted at the forward end 50 thereof. Ride control assemblies 10 are horizontally mounted near the rear end of each side of the seat, with the mechanical linkages 32, 42 pivotally connected to the frame of the vehicle. Rather than as shown in FIGS. 3 and 4 the ride control assembly 10 may be horizontally mounted to the frame of the vehicle and the mechanical linkage pivotally secured to the seat support.

The tension on the torsion spring is preloaded in accordance with the static weight of the vehicle operator. The viscous fluid in the cylinder may be No. 90 hydraulic oil or other suitable fluid which exerts sufficient frictional resistance or drag against the blades travelling therein to damp dynamic and/or shock loadings to give smooth, steady action of the ride control assembly.

The unit is mounted so that rotation of the linking arm 32 in response to dynamic and/or shock loading acts to load the torsion spring by rotation of member 24 relative to fixed tension block 16. The spring-back or rebound of the loaded torsion spring is damped by the drag of the blades travelling in the viscous fluid, thereby preventing excessive rebound and giving a smooth, steady ride for the vehicle operator.

The embodiments of the invention in which a particular property or privilege is claimed are defined as follows:

1. A vehicle seat assembly comprising:
a vehicle frame,
a seat support,
a ride control assembly including (1) a cylindrical housing mounted horizontally in a fixed position relative to the seat support; (2) members at each end of the cylindrical housing, one member being rotatable relative to the other and the other being normally stationary but adjustable; (3) an axially wound torsion spring extending through the cylindrical housing between the members and attached thereto for resisting relative axial turning movement of the rotatable member relative to the fixed member; (4) a plurality of spaced apart blades extending axially of the housing and integral with the rotatable member; (5) a mechanical linkage operatively connected between the rotatable member and the vehicle frame to suspend the seat support for rising and falling movement in response to dynamic loadings imposed; and (6) a viscous fluid filling the lower portion of the cylindrical housing through the blades pass on rotation of the rotatable member to which they are attached, the blades imposing a viscous drag on movement on the rotatable member during loading and unloading of the torsion spring due to rising and falling movement of the seat support in response to dynamic loadings imposed thereon, resulting in dampening of rebound and providing cushioning.

2. The seat assembly of claim 1 including means for pre-loading the torsion spring in accordance with the static load imposed on the seat support.

3. The seat assembly of claim 2 wherein the means for pre-loading the torsion spring includes a detent arrangement allowing the stationary member to be turned a predetermined degree relative to the rotatable member to pre-load the torsion spring a desired amount.

4. The seat assembly of claim 1 wherein the seat support is pivotally mounted at its forward end to the vehicle frame and the ride control assembly is mounted near the rear end of the seat support.

* * * * *